US009661152B2

(12) United States Patent
Chai et al.

(10) Patent No.: US 9,661,152 B2
(45) Date of Patent: *May 23, 2017

(54) POLICY DECISION METHOD, CHARGING DEVICE, AND SYSTEM

(71) Applicant: Huawei Technologies Co., Ltd., Shenzhen (CN)

(72) Inventors: Xiaoqian Chai, Shenzhen (CN); Na Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,502

(22) Filed: Nov. 11, 2016

(65) Prior Publication Data

US 2017/0064089 A1 Mar. 2, 2017

Related U.S. Application Data

(63) Continuation of application No. 14/879,290, filed on Oct. 9, 2015, now Pat. No. 9,516,173, which is a
(Continued)

(30) Foreign Application Priority Data

Jan. 22, 2013 (CN) .......................... 2013 1 0023386

(51) Int. Cl.
*H04L 12/28* (2006.01)
*H04M 15/00* (2006.01)
(Continued)

(52) U.S. Cl.
CPC ........ *H04M 15/66* (2013.01); *H04L 12/1407* (2013.01); *H04L 41/0893* (2013.01)

(58) Field of Classification Search
CPC ................................................. H04L 12/1407
See application file for complete search history.

(56) References Cited

U.S. PATENT DOCUMENTS

| 9,215,336 B2 | 12/2015 | Chai et al. | |
| 2009/0055543 A1* | 2/2009 | Rasanen | H04L 29/125 709/228 |

(Continued)

FOREIGN PATENT DOCUMENTS

| CN | 101110681 A | 1/2008 |
| CN | 101132291 A | 2/2008 |

(Continued)

OTHER PUBLICATIONS

3GPP TS 23.203 V11.8.0 (Dec. 2012) "Technical Specification Group Services and System Aspects; Policy and Tharging control architecture, (Release 11)", 3rd Generation Partnership Project. Total 178 pages.

(Continued)

*Primary Examiner* — Afshawn Towfighi
(74) *Attorney, Agent, or Firm* — Huawei Technologies Co., Ltd.

(57) ABSTRACT

A policy decision method is provided, including receiving, by a policy and charging rules function (PCRF) device, a first user policy request for a first user sent by a gateway device, determining, by the PCRF device, that the first user and a second user share a usage quota, and the second user is an owner user of the usage quota, acquiring, by the PCRF device, a current second user counter status of a second user counter of the second user, and generating, by the PCRF device, a first user control policy according to the current second user counter status and sending the first user control policy to the gateway device. The present invention can implement sharing of accumulated data among users,
(Continued)

reduces processing pressure of the charging system, and decreases a performance loss of the charging system.

18 Claims, 10 Drawing Sheets

Related U.S. Application Data continuation of application No. 14/741,795, filed on Jun. 17, 2015, now Pat. No. 9,215,336, which is a continuation of application No. PCT/CN2014/070126, filed on Jan. 4, 2014.

(51) Int. Cl.
*H04L 12/14* (2006.01)
*H04L 12/24* (2006.01)

(56) References Cited

U.S. PATENT DOCUMENTS

| | | | |
|---|---|---|---|
| 2009/0164355 A1 | 6/2009 | Mo et al. | |
| 2009/0207757 A1* | 8/2009 | Andreasen | H04L 12/1403 370/254 |
| 2012/0081557 A1* | 4/2012 | Kupinsky | H04L 12/1407 348/207.1 |
| 2012/0096139 A1* | 4/2012 | Cackowski | G06F 17/30525 709/223 |
| 2012/0117235 A1* | 5/2012 | Castro Castro | H04L 12/14 709/224 |
| 2012/0224538 A1* | 9/2012 | Stenfelt | H04M 15/00 370/328 |
| 2012/0233325 A1* | 9/2012 | Zhou | H04L 12/1407 709/224 |
| 2013/0036215 A1* | 2/2013 | Kupinsky | H04L 41/0893 709/223 |

FOREIGN PATENT DOCUMENTS

| | | |
|---|---|---|
| CN | 101159630 A | 4/2008 |
| CN | 101730046 A | 6/2010 |
| CN | 101754161 A | 6/2010 |
| CN | 1017030046 A | 6/2010 |
| CN | 102083035 A | 6/2011 |
| CN | 102647698 A | 8/2012 |
| CN | 102695155 A | 9/2012 |
| EP | 2192718 A1 | 6/2010 |

OTHER PUBLICATIONS

Magnus Olsson et al., "Policy and Charging Control", in: "EPC and 4G Packet Networks", XP055218099, Oct. 3, 2012, Total 18 pages.

* cited by examiner

POLICY DECISION METHOD, CHARGING DEVICE, AND SYSTEM

CROSS-REFERENCE TO RELATED APPLICATIONS

This application is a continuation of U.S. patent application Ser. No. 14/879,290, now allowed, filed on Oct. 9, 2015, which is a continuation of U.S. patent application Ser. No. 14/741,795, filed on Jun. 17, 2015, now U.S. Pat. No. 9,215,336, which is a continuation of International Application No. PCT/CN2014/070126, filed on Jan. 4, 2014. The International Application claims priority to Chinese Patent Application No. 201310023386.3, filed on Jan. 22, 2013. The aforementioned patent applications are hereby incorporated by reference in their entireties.

TECHNICAL FIELD

The present invention relates to the communications field, and specifically, to a policy decision method, a charging device, and a system.

BACKGROUND

Massive 3G deployment greatly promotes use of data services. Facing fierce competition, in order to improve user loyalty, an operator provides QoS (Quality of Service) assurance for a data service as an important means.

PCC (Policy and Charging Control) is a set of policy and charging control mechanisms defined by the 3GPP (3rd Generation Partnership Project), and its architecture is shown in FIG. 1. The architecture includes a policy and charging enforcement function (PCEF), a traffic detection function (TDF), a bearer binding and event reporting function (BBERF), a policy and charging rules function (PCRF), an application function (AF), an online charging system (OCS), an offline charging system (OFCS), and a subscription profile repository (SPR). The architecture includes interfaces such as Gx, Sy, Gy, and Ro, where Gx is an interface between the PCRF and the PCEF, Sy is an interface between the PCRF and the OCS, Gy is an online charging interface between the PCEF and the OCS, and Ro is a collective term for online charging interfaces between a network element and the OCS. The PCEF is located in a gateway device, and the TDF is a logical function and may be disposed in or outside the gateway device.

The core of a PCC mechanism is as follows:

When establishing a data flow bearer, the gateway device requests, from the PCRF, a control policy and a charging policy for a data flow; according to subscription information stored in the SPR, information such as a user's accumulated usage or usage quota or account balance from the OCS (the accumulated usage, usage quota, account balance or the like from the OCS may be called counters), bearer layer information provided by the gateway device, and some local policies configured by an operator in the PCRF, the PCRF generates a policy on dynamic charging and service data flow control or determines a to-be-activated policy on static charging and service data flow control. Certainly, if the application function AF has provided the PCRF with service layer information of a service, the PCRF takes the service layer information into account when generating the policy on dynamic charging and service data flow control or determining the to-be-activated policy on static charging and service data flow control.

The PCRF delivers a command to the gateway device to install/activate the generated policy on dynamic charging and service data flow control or the policy on static charging and service data flow control, and the gateway device performs resource allocation, data flow control, and charging control according to the installed/activated policy; the PCEF may be triggered, according to the charging policy of the PCRF, to report a charging event and the user's usage information to the OCS; the OCS accumulates the user's usage information.

When the accumulation reaches a predefined threshold, the OCS reports accumulation information according to the user's Sy session between the PCRF and the OCS, so that the PCRF may further decide, based on the accumulation information, a data flow control policy, and deliver the decided policy to the PCEF for execution. The accumulation information is used to indicate a current accumulation status of a counter. The accumulation status indicates in which threshold range the counter is currently located. For example, when an accumulation amount of a counter is less than 100 MB, a status 1 is used as an indication; when the accumulation amount falls within 100 MB-1 GB, a status 2 is used as an indication; when the accumulation amount is greater than 1 GB, a status 3 is used as an indication. Subsequent counters and status definitions thereof are the same.

This mechanism can implement precise control on a service data flow according to an operator policy, so as to implement refined bandwidth operation.

When an existing technical solution is implemented, the following technical problems exist:

An existing Sy session is a user-level session, and a user of the Sy session and a user of a Gx session must be a same user, that is, users can use only their own accumulation information.

In an implementation process in which multiple users share a volume quota, this method requires a PCRF and a charging system to set an associated counter for each user, and requires the PCRF to subscribe to a same counter, namely, the associated counter, for each user in the charging system. The charging system needs to perform accumulation on the associated counter of each user no matter whether the user is online. Consequently, implementation is complicated in the PCRF and the charging system, and a quantity of signaling interactions between the PCRF and the charging system increases, which seriously affects the performance. Especially for a system that imposes a very high requirement of real-time performance, such as the OCS, the performance is significantly affected.

SUMMARY

Embodiments of the present invention provide a policy decision method, a charging device and a system that enable a user to use accumulated data of other users, so as to implement sharing of accumulated data among users, reduce processing pressure of a charging system, and reduce a quantity of interactions between the charging system and a PCRF.

According to a first aspect, an embodiment of the present invention provides a policy decision method, including:

receiving, by a policy and charging rules function (PCRF) device, a first user policy request for a first user sent by a gateway device;

determining, by the PCRF device, that the first user and a second user share a usage quota, and the second user is an owner user of the usage quota;

acquiring, by the PCRF device, a current second user counter status of a second user counter of the second user; and generating, by the PCRF device, a first user control policy according to the current second user counter status and sending the first user control policy to the gateway device.

According to a second aspect, an embodiment of the present invention provides a policy and charging rules function (PCRF) device, including:

a first receiving unit, configured to receive a first user policy request for a first user sent by a gateway device;

a querying unit, configured to determine that the first user and a second user share a usage quota, and the second user is an owner user of the usage quota;

a first acquiring unit, configured to acquire a current second user counter status of a second user counter of the second user;

a deciding unit, configured to generate a first user control policy according to the current second user counter status; and a first sending unit, configured to send the first user control policy to the gateway device.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a charging system refers to an online charging system OCS or an offline charging system OFCS.

In the embodiments of the present invention, an entity may be expressed as a device. Each entity may be a standalone device or may be a device disposed in another device. For example, a PCRF device may be a PCRF device.

Figure 1:
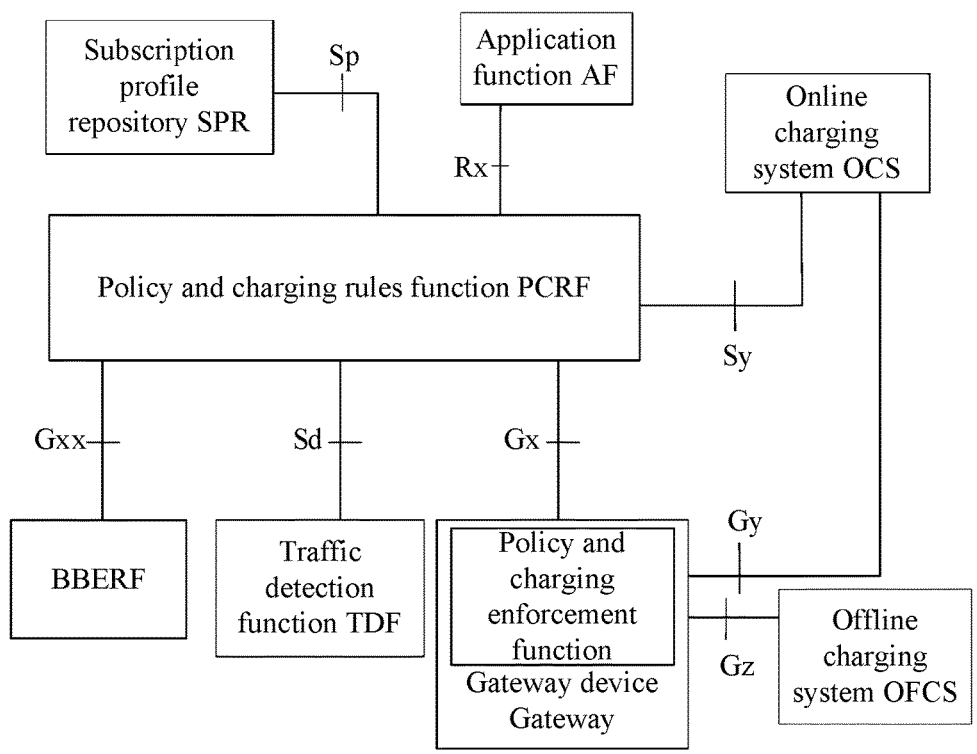
FIG. 1 is a structural diagram of a policy and charging control system according to the prior art.
Figure 2:
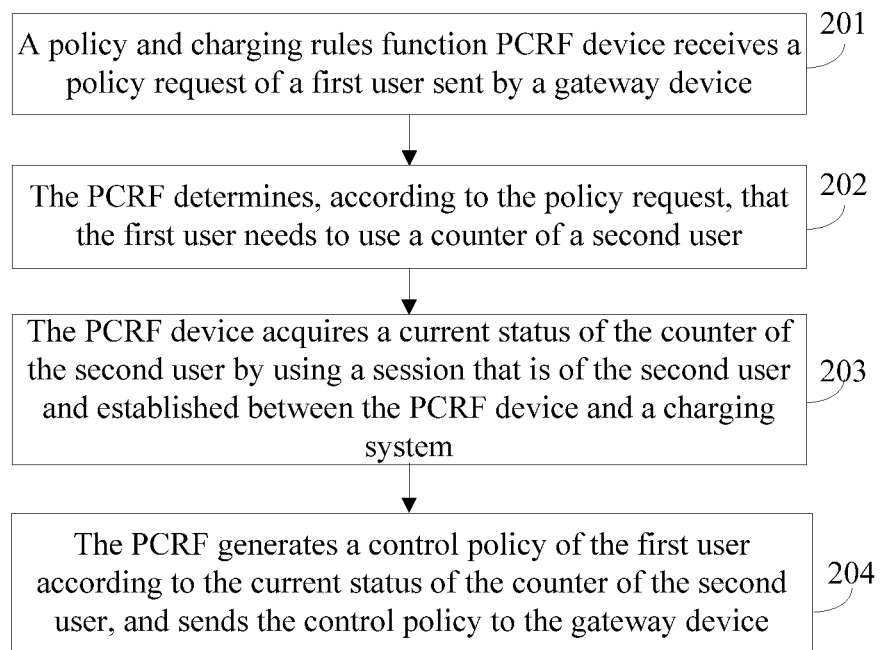
FIG. 2 is a flowchart of a policy decision method according to an embodiment of the present invention.

First, a policy decision method according to an embodiment of the present invention is described. FIG. 2 describes a process of a policy decision method according to an embodiment of the present invention, including:

201. A policy and charging rules function PCRF device receives a policy request for a first user sent by a gateway device, where the policy request may be sent by a policy and charging enforcement function PCEF or a traffic detection function TDF located in the gateway device.

The policy request for the first user is used to acquire, from the PCRF device, a control policy on a service used by the first user.

202. The PCRF device determines, according to the policy request, that the first user needs to use a counter of a second user.

The counter that is of the second user and needs to be used is a counter obtained by accumulating accumulated data of the second user.

203. The PCRF device acquires a current status of the counter of the second user.

204. The PCRF device generates a control policy of the first user according to the current status of the counter of the second user, and sends the control policy to the gateway device.

From the foregoing technical solution provided by the embodiment of the present invention, it can be seen that, in the embodiment of the present invention, after receiving a policy request for a first user, a PCRF device determines that the first user can use accumulated data of a second user, thereby implementing sharing of the accumulated data among the first user and the second user. In this way, a charging system needs to maintain only one copy of the accumulated data of the second user, and one PCRF device needs to establish only one session with an OCS and acquire a status of the accumulated data of the second user by using the session for one time, to implement policy control, based on the accumulated data, on all first users who can share a usage quota with the second user, which reduces pressure of processing such as maintenance and notification performed by the charging system on the shared accumulated data, reduces a quantity of sessions established between the charging system and the PCRF device and a quantity of interactions between the charging system and the PCRF device, and further decreases a performance loss of the charging system.

In the embodiment of the present invention, accumulated data is service usage information that needs to be accumulated, where the service usage information includes a traffic volume or duration; a counter is an item obtained by accumulating accumulated data according to a granularity or a rule, for example, traffic volume accumulation or duration accumulation; a shared usage quota is a quota, that is, a quota of a traffic volume or duration that sharing users are allowed to use; a status of a counter is an identifier of a range or a threshold range, or a specific numerical value, for example, for a traffic volume, 0-100 MB is one status, and 100 MB-200 MB is another status.

In the embodiment of the present invention, the determining, by the PCRF device according to the policy request, that the first user needs to use a counter of a second user includes: acquiring, by the PCRF device, an identifier of the first user from the policy request; and determining, by the PCRF device according to the identifier of the first user, that the first user and the second user are users who share a usage quota, and determining that the first user needs to use the counter of the second user. Therefore, in the embodiment of the present invention, the first user can use accumulated data of a user who shares a usage quota with the first user, thereby implementing sharing of accumulated data among users who share a usage quota. In the embodiment of the present invention, sharing of a usage quota means that information such as a traffic volume, duration and consumption amounts of multiple users are accumulated together as a common accumulated amount; when the common accumulated amount reaches a threshold, a change to a control policy on services of all or some of the multiple users is triggered.

The determining, by the PCRF device according to the identifier of the first user, that the first user and the second user are users who share a usage quota specifically includes the following three cases:

Case 1: The PCRF device queries stored information according to the identifier of the first user, determines that the first user is a member of a group, and determines that an owner of the group is the second user, and then the PCRF device determines that the first user and the second user are users who share a usage quota.

Case 2: The PCRF device queries stored information according to the identifier of the first user, and determines that a second user who has an association relationship with the first user exists, and then the PCRF device determines that the first user and the second user are users who share a usage quota.

Case 3: The PCRF device queries stored information according to the identifier of the first user, and determines that the first user is a member of a group identified by the second user, where the second user is an identifier of a group including multiple users, and then the PCRF device determines that the first user and the second user are users who share a usage quota.

In the embodiment of the present invention, the stored information may be stored in the PCRF device, or stored in an external entity of the PCRF device, such as an SPR or a UDR (User Data Repository). The PCRF device determines, by querying the information stored in or outside the PCRF device, that the first user and the second user are users who can share a usage quota.

In the embodiment of the present invention, the acquiring, by the PCRF device, a current status of the counter of the second user specifically includes: acquiring, by the PCRF device, the current status of the counter of the second user by using a session that is of the second user and established between the PCRF device and a charging system, which may specifically include the following three cases:

Case 1: Before the PCRF device receives the policy request for the first user sent by the gateway device, if the session of the second user has been established between the PCRF device and the charging system and the PCRF device has acquired and saved the current status of the counter of the second user by using the session of the second user, the PCRF reads the current status that is of the counter of the second user and saved by the PCRF device.

Case 2: Before the PCRF device receives the policy request for the first user sent by the gateway device, if the session of the second user has been established between the PCRF device and the charging system, the PCRF device acquires the current status of the counter of the second user from the charging system by using the session of the second user. Preferably, the PCRF device has not saved the current status of the counter of the second user, and therefore, the PCRF acquires the current status of the counter by using the session of the second user, where the having not saved the current status of the counter of the second user means that the current status of the counter has not been acquired, or the current status of the counter has been acquired but is not saved. That the PCRF device acquires the current status specifically includes: the PCRF device sends a counter status acquiring request to the charging system by using the session of the second user, where the counter status acquiring request includes an identifier of the counter; and the PCRF device receives a response message that is of the counter status acquiring request and sent by the charging system, where the response message includes the current status of the counter of the second user that is obtained by the charging system by means of query according to the identifier of the counter. In this case, the session of the second user is a session that already exists, and the PCRF device acquires the current status of the counter of the second user by using the session that is of the second user and that already exists.

Case 3: The PCRF device sends a session establishment request of the second user to the charging system, where the session establishment request carries an identifier of the second user; and the PCRF device receives a response message that is of the session establishment request and sent by the charging system, where the response message includes a result of session establishment by the charging system according to the identifier of the second user and includes the acquired current status of the counter of the second user. The session establishment request may carry an identifier of the counter, and the charging system directly returns the current status of the counter. Alternatively an identifier of the counter may be not carried, and when the identifier of the counter is not carried, the charging system returns current statuses of all available counters, including the current status of the counter. In this case, the session of the second user is a session that is newly established when the current status of the counter of the second user is required, and the PCRF device acquires the current status of the counter of the second user by using the newly established session of the second user.

In case 2 and case 3, the PCRF device may save the acquired current status of the counter of the second user; when the session of the second user is ended or when the session of the second user is not ended but the PCRF device determines that the current status of the counter of the second user is no longer required, the PCRF device deletes the saved current status of the counter of the second user. That the session of the second user is ended means that services of all first users who can share a usage quota with the second user are ended, or the PCRF device interrupts the session of the second user when the services of the first users no longer rely on the counter of the second user for policy control. That the session of the second user is not ended but the PCRF device determines that the current status of the counter of the second user is no longer required means that the services of all the first users are still in use, but the services of the first users rely on other counters of the second user for policy control, and when the services of the first users no longer reply on the counter of the second user, the PCRF device no longer saves the current status of the counter, and the PCRF device cancels subscription to the counter.

In the embodiment of the present invention, after the acquiring, by the PCRF device, a current status of the counter, the method further includes: receiving, by the PCRF device, a notification message sent by the charging system, where the notification message carries a changed status of the counter of the second user; determining, by the PCRF device, that the changed status of the counter of the second user affects the first user; and re-generating, by the PCRF device, a control policy for the affected first user according to the changed status of the counter, and sending the re-generated control policy to the gateway device by using a session that is of the first user and between the gateway device and the PCRF device.

Certainly, in the embodiment of the present invention, the determining that the changed status of the counter of the second user affects the first user specifically includes: querying, by the PCRF device, stored information and determining that the second user and the first user are users who share a usage quota and that the first user is currently online, and determining that the changed status of the counter of the second user affects the first user.

In the embodiment of the present invention, after the PCRF device receives a notification that carries a changed status of the counter of the second user and is sent by the charging system, the PCRF device may save the acquired current status of the counter of the second user; when the session of the second user is ended or when the session of the second user is not ended but the PCRF device determines that the current status of the counter of the second user is no longer required, the PCRF device deletes the saved current status of the counter of the second user.

Figure 3:
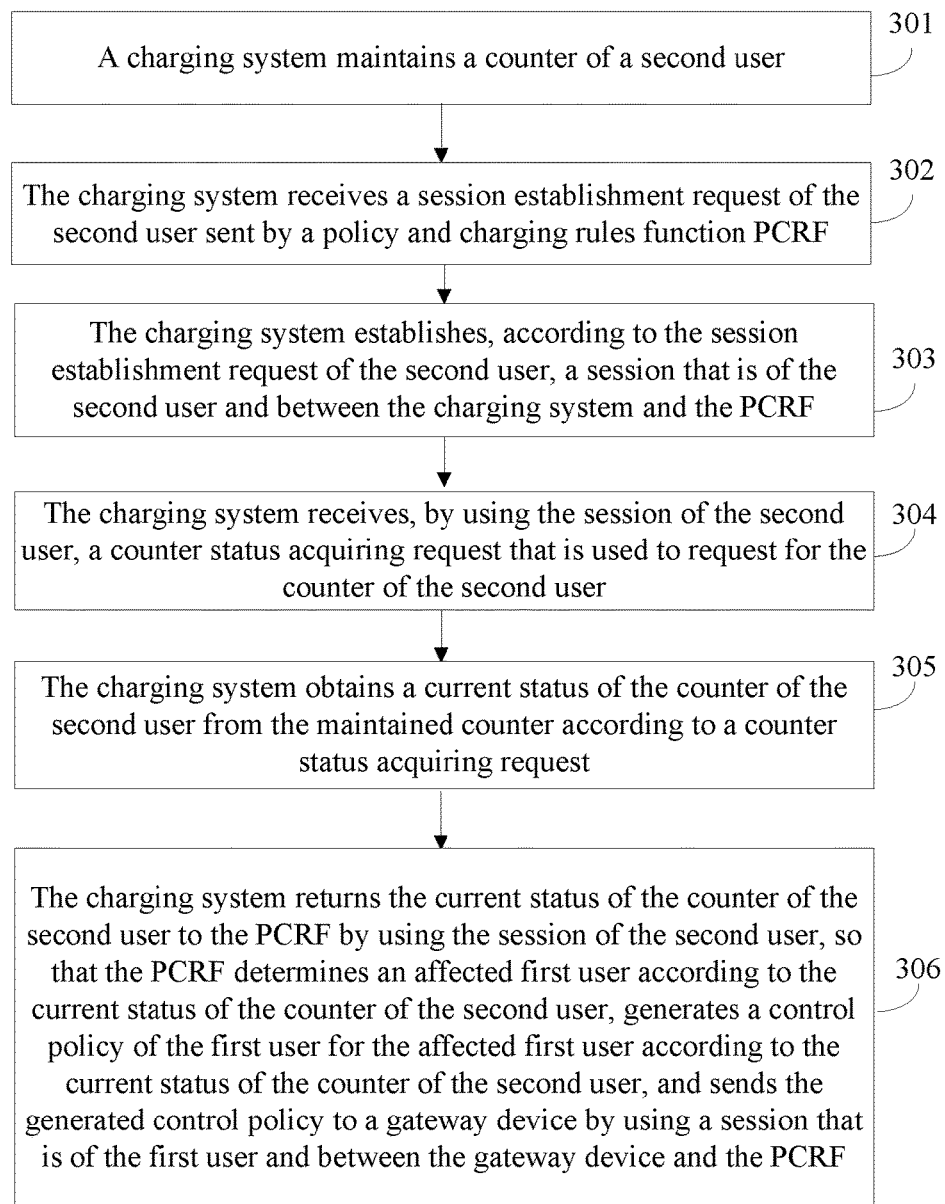
FIG. 3 is a flowchart of a policy decision method according to another embodiment of the present invention.

FIG. 3 describes a process of a policy decision method according to an embodiment of the present invention, including:

301. A charging system maintains a counter corresponding to accumulated data of a second user, where the accumulated data is accumulations of service usage information of the user.

302. The charging system receives a session establishment request that is of the second user and sent by a PCRF device.

303. The charging system establishes, according to the session establishment request of the second user, a session that is of the second user and between the charging system and the PCRF device.

304. The charging system receives, by using the established session, a counter status acquiring request that is used to request a counter of the second user. Specifically, the counter status acquiring request that is used to request a counter of the second user may be received during or after establishment of the session.

305. The charging system obtains, according to the counter status acquiring request, a current status of the counter of the second user from the maintained counter corresponding to the accumulated data.

306. The charging system returns the current status of the counter of the second user to the PCRF device by using the session of the second user, so that the PCRF device determines an affected first user according to the current status of the counter of the second user, generates a control policy of the first user for the affected first user according to the current status of the counter of the second user, and sends the generated control policy to a gateway device by using a session that is of the first user and between the gateway device and the PCRF device.

From the foregoing technical solution provided by the embodiment of the present invention, it can be seen that, in the embodiment of the present invention, a charging system maintains accumulated data of service usage information of a second user and a status of a counter corresponding to the accumulated data, and after receiving a counter status acquiring request of the second user, acquires a current status of the counter of the second user from the maintained counter, and sends the current status of the counter of the second user to a PCRF device, so that the PCRF device determines a first user affected by the current status of the counter of the second user, and generates a control policy for the affected first user according to the current status of the counter of the second user, thereby implementing sharing of the accumulated data between the first user and the second user. In this way, a charging system needs to maintain only one copy of the accumulated data of the second user, and one PCRF device needs to establish only one session with an OCS and acquire a status of the accumulated data of the second user by using the session for one time, to implement policy control, based on the accumulated data, on all first users who have an association relationship with the second user, which reduces pressure of processing such as maintenance and notification performed by the charging system on the shared accumulated data, reduces a quantity of sessions established between the charging system and the PCRF device and a quantity of interactions between the charging system and the PCRF device, and further decreases a performance loss of the charging system.

In the method according to the embodiment of the present invention, after the charging system sends the current status of the counter of the second user to the PCRF device, if the current status of the counter of the second user changes, the method according to the embodiment of the present invention may further include: sending, by the charging system by using the session of the second user, a notification message to the PCRF device when a status of the counter changes, where the notification message carries a changed status of the counter of the second user, so that the PCRF device determines the affected first user according to the changed status of the counter, re-generates a control policy of the first user for the affected first user according to the changed status of the counter, and sends the re-generated control policy to the gateway device. That a status of the counter changes may be that: a change of a value of the counter of the second user causes a current value of the counter (that is, an accumulated amount) to be greater than or less than a set value. For example, when a set threshold is exceeded, the charging system sends a notification message to the PCRF device again.

In the embodiment of the present invention, the receiving, by the charging system by using the session of the second user, a counter status acquiring request that is used to request a counter of the second user specifically includes: receiving, by the charging system, the counter status acquiring request sent by the PCRF device, where the counter status acquiring request includes an identifier of the counter; and sending, by the charging system, a response message of the counter status acquiring request to the PCRF device, where the response message includes the current status of the counter of the second user that is obtained by the charging system by means of query according to the identifier of the counter. Certainly, in the solution of the embodiment of the present invention, the counter status acquiring request may be used to subscribe to the current status of the counter when being used to acquire the current status of the counter.

Figure 4:
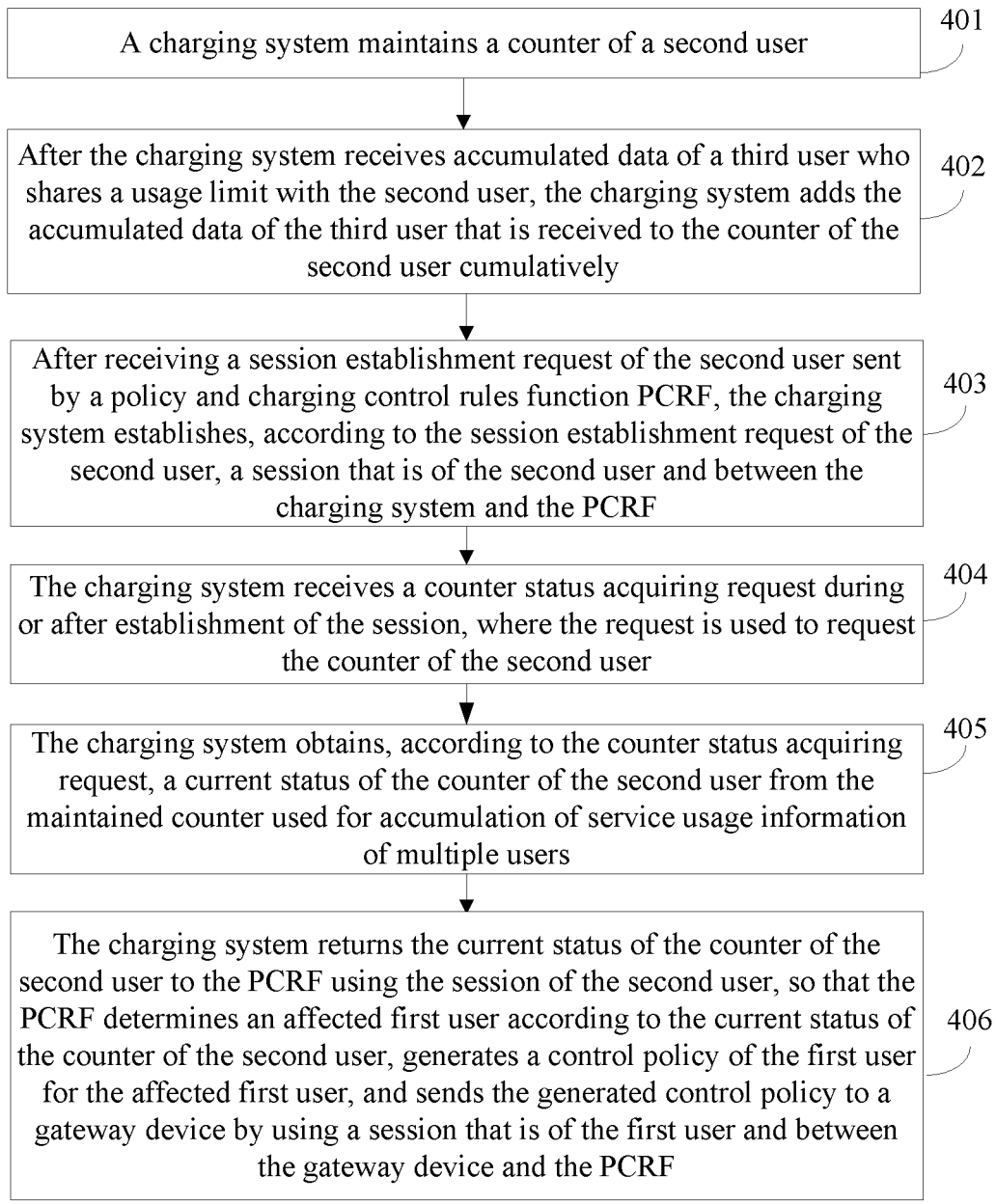
FIG. 4 is a flowchart of a policy decision method according to another embodiment of the present invention.

FIG. 4 describes a process of a policy decision method according to another embodiment of the present invention, including:

401. A charging system maintains a counter of a second user, where the counter is a counter obtained by accumulating accumulated data of service usage information of the user. For a specific process, reference may be made to the related description in step 402.

402. After the charging system receives accumulated data (service usage information that needs to be accumulated) of a third user who shares a usage quota with the second user, the charging system adds the accumulated data of the third user that is received to the counter of the second user cumulatively.

403. After receiving a session establishment request of the second user sent by a policy and charging rules control function PCRF, the charging system establishes, according to the session establishment request of the second user, a session that is of the second user and between the charging system and the PCRF.

404. The charging system receives, by using the session of the second user, a counter status acquiring request that is used to request the counter of the second user.

405. The charging system obtains a current status of the counter of the second user from the maintained counter of the second user according to the counter status acquiring request.

406. The charging system sends the current status of the counter of the second user to the PCRF, so that the PCRF determines an affected first user according to the current status of the counter of the second user, generates a service flow control policy of the first user for the affected first user according to the current status of the counter of the second user, and sends the generated service flow control policy to a gateway device by using a session that is of the first user and between the gateway device and the PCRF.

In this embodiment, for the third user who shares a usage quota with the second user, there may be the following three cases:

Case 1: The third user is a member of a group, and an owner of the group is the second user; then the second user and the third user are users who share a usage quota.

Case 2: The second user and the third user are users who have an association relationship, and then the second user and the third user are users who share a usage quota.

Case 3: The third user is a member of a group, and the second user identifies a group including multiple users, where the third user is a member of the group that is the second user; then the third user and the second user are users who share a usage quota.

Herein, the first user, the second user, and the third user share a usage quota, where the first user refers to a user who currently requires policy control to be performed based on the counter of the second user, and the third user refers to a currently online user no matter whether the third user requires policy control to be performed based on the counter of the second user. That is, the third user includes the first user. For the related description of a case in which the first user and the second user are users who can share a usage quota and the related description of the first user affected by the current status of the counter of the second user, reference may be made to the related description of other embodiments of the present invention, and details are not described herein again.

Certainly, the technical solution disclosed in the embodiment shown in FIG. 4 may be used in combination with the technical solution in the embodiment shown in FIG. 3. That is, the charging system can implement sharing of accumulated data between the first user and the second user, and can also accumulate the accumulated data of the third user who shares a usage quota with the second user, and add the accumulated data of the third user to the counter of the second user cumulatively.

Figure 5:
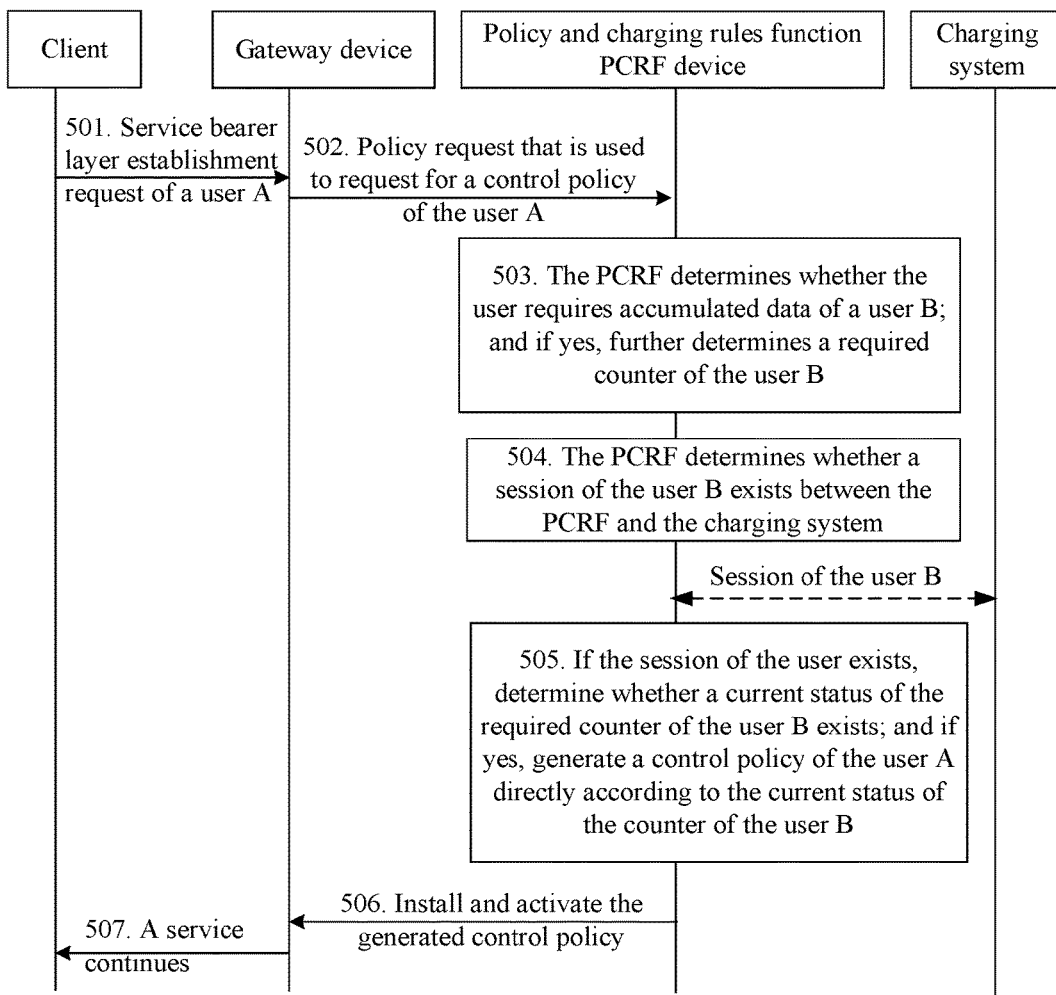
FIG. 5 is a flowchart of a policy decision method according to another embodiment of the present invention.

FIG. 5 describes a process of a policy decision method according to another embodiment of the present invention, including:

Step 501: After receiving a service bearer layer establishment request of a user A sent by a client of the user A, a gateway device determines that a control policy needs to be requested from a PCRF device.

The service bearer layer establishment request may be an IP (Internet Protocol) connectivity access network bearer (IP CAN Bearer) service bearer layer establishment request or a packet data protocol (PDP) context (PDP Context) service bearer layer establishment request corresponding to a GPRS network, where the service bearer layer establishment request includes an identifier of the user A, and the identifier may be an IP address assigned to the user A.

Specifically, the gateway device may determine, according to preconfigured information, that the control policy of the user A needs to be requested from the PCRF device.

Step 502: The PCRF device receives a policy request for the user A that is sent by the gateway device and is used to request the control policy of the user A.

The control policy is a control policy, of service data flow, allocated by the PCRF device to the user A. The control policy includes one or more of the following: quality of service (QoS) of the service data flow, whether the service data flow is allowed to pass, redirection of the service data flow, charging control of the service data flow, or the like. The control policy is delivered to the gateway device, so that the gateway device allocates a network resource according to the control policy.

The gateway device requests for a control policy from the PCRF device by using a Gx or Sd session (a session between the gateway device and the PCRF device) of the user A. The Gx session is a session between a PCEF and the PCRF device, and the Sd session is a session between a TDF and the PCRF device.

Step 503: The PCRF device determines whether accumulated data of a user B who shares a usage quota is required for deciding the control policy of the user A.

The user A and the user B are users who share a usage quota, which includes the following three cases:

Case 1: The user A is a member of a group, an owner of the group is the user B, and then the user A needs to use the accumulated data of the owner B of the group.

Specifically, by querying subscription information of the user A, the PCRF device determines whether the user belongs to a user group. If the user belongs to the user group, the PCRF device acquires an owner of the user group (assuming that the owner of the user group to which the user A belongs is the user B). Found information may be shown in Table 1 in the following. It is learned by querying the table that the user A belongs to a group 1, namely, the group of group 1; an owner of the group 1 group is the user B; a counter of associated accumulated data is a counter 123.

TABLE 1

| User   | Group   | Group owner | Counter     |
|--------|---------|-------------|-------------|
| User A | Group 1 | User B      | Counter 123 |

Case 2: An association relationship exists between the user A and the user B, where the association relationship may be determined during or after subscription. When an association relationship exists between the user A and the user B, the user A needs to use the accumulated data of the user B.

The association relationship in the embodiment of the present invention may also be a dependence relationship. For example, the user A is dependent on the user B, and account cancellation of the user B may lead to account cancellation of the user A. Alternatively, the association relationship may be another binding relationship. For example, the account of the user A and the account of the user B are mutually dependent but have their respective life cycles.

Specifically, the PCRF device may query subscription information of the user A, and determine, according to a found association relationship between the user A and the user B, whether the user A requires the accumulated data of the user B. When an association relationship exists between the user A and the user B, the user A requires the accumulated data of the user B. The found information may be shown in Table 2 in the following:

TABLE 2

| User   | Dependent user | Relationship      |
|--------|----------------|-------------------|
| User A | User B         | Secondary account |

Case 3: The user A is a member of a group identified by the user B, and the user B is an identifier of the group; then the user A needs to use the accumulated data of the user B.

Specifically, by querying subscription information of the User A, the PCRF determines that the user A is a member of a user group. The PCRF then acquires an identifier of the user group (assuming that the identifier of the user group to which the user A belongs is the User B). Found information may be shown in Table 3 in the following. It is learned by querying Table 3 that the user A belongs to the group, namely, the User B, a quota shared by members of the User B group is a counter 456, and therefore, the user A shares the usage quota counter 456 of the user B.

TABLE 3

| User   | Group | Counter    |
|--------|-------|------------|
| User A | B     | counter456 |

The subscription information that is of the user A and queried by the PCRF device may be acquired from an internal or external subscription relationship storage entity, where an example of the external subscription relationship storage entity is an SPR.

If, in the three cases, the PCRF device determines that policy decision for the user A requires the accumulated data of the user B, the PCRF device further determines a required counter of the user B, and performs step 504; otherwise, the PCRF device generates a control policy according to information about the user A, and performs step 506.

Step 504: The PCRF device determines whether a Sy session of the user B exists between the PCRF device and a charging system. If the Sy session of the user B exists, step 505 is performed; otherwise, refer to the related description of establishment of a Sy session in the embodiment shown in FIG. 6.

Specifically, according to information about all Sy sessions that are managed by the PCRF device and performed between the PCRF device and the charging system, the PCRF device queries and determines whether a Sy session of the user B exists.

Step 505: The PCRF device determines whether a current status of the required counter of the user B exists in the PCRF device. That is, the PCRF device determines whether the PCRF device has acquired and saved the counter of the user B by using a Sy session between the PCRF device and the charging system. If the PCRF device has acquired and saved the current status of the counter, the PCRF device performs policy decision directly according to the current status that is of the counter of the user B and saved by the PCRF device, and delivers a service flow control policy generated by means of policy decision to the gateway device.

Specifically, the PCRF device sends a counter status acquiring request to the charging system by using the Sy session between the PCRF device and the charging system, which is also equivalent to subscribing to the current status of the counter. When a status of the counter changes subsequently, if an accumulated amount of the counter is greater than or less than a threshold, an OCS, namely, the charging system, notifies the PCRF device of a changed status of the counter.

Step 506: The PCRF device sends the control policy to the gateway device, and then activates the control policy.

The control policy is delivered to the gateway device by using a response message corresponding to the request message in step 502.

Step 507: The gateway device executes the control policy after receiving a response message, and a service continues.

After receiving the control policy delivered by the PCRF device, the PCEF allocates a corresponding network resource to a service data flow according to data such as QoS and bandwidth allocated in the control policy.

From the foregoing technical solution provided by the embodiment of the present invention, it can be seen that, in the embodiment of the present invention, after receiving a policy request for a first user, a PCRF device determines that the first user can use accumulated data of a second user, thereby implementing sharing of the accumulated data between the first user and the second user. In this way, a charging system needs to maintain only one copy of the accumulated data of the second user, and one PCRF device needs to establish only one session with an OCS and acquire a status of the accumulated data of the second user by using the session for one time, to implement policy control, based on the accumulated data, on all first users who have an association relationship with the second user, which reduces pressure of processing such as maintenance and notification performed by the charging system on the shared accumulated data, reduces a quantity of sessions established between the charging system and the PCRF device and a quantity of interactions between the charging system and the PCRF device, and further decreases a performance loss of the charging system.

Figure 6:
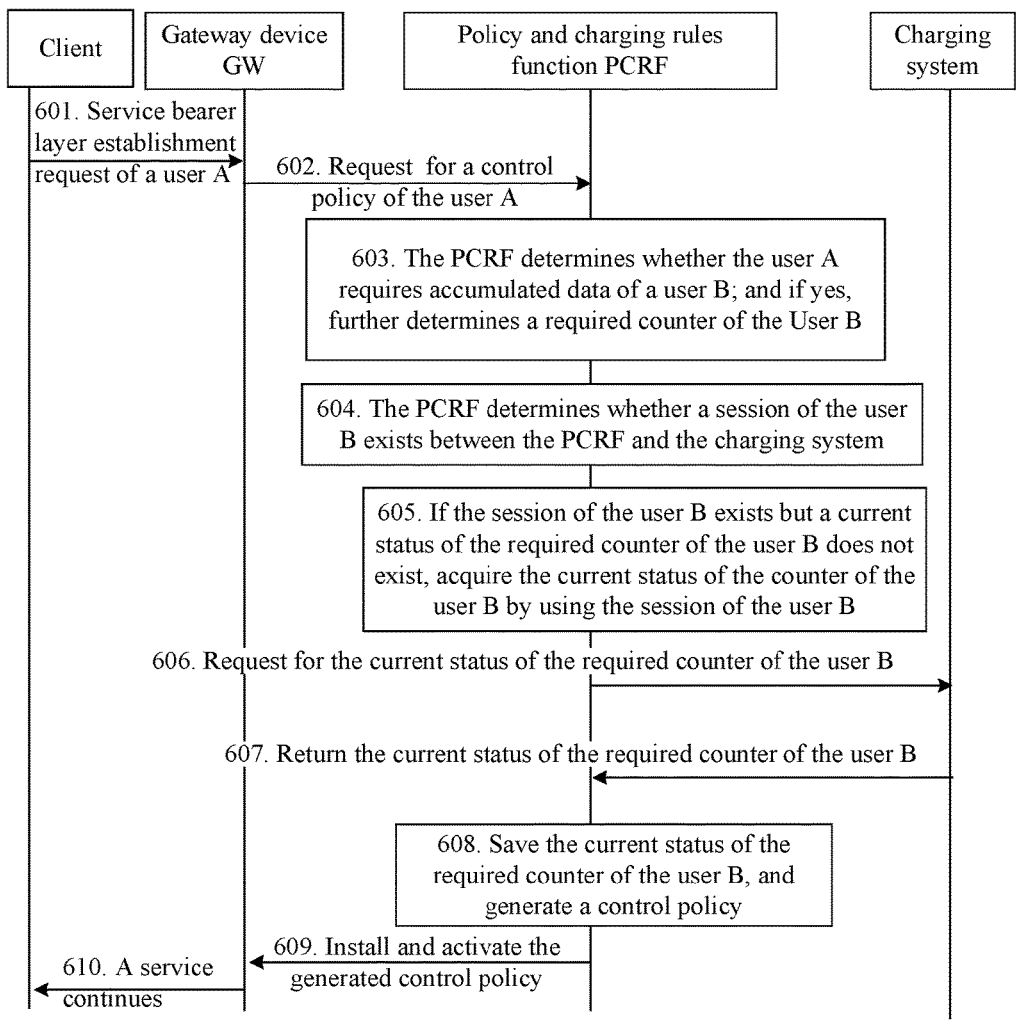
FIG. 6 is a flowchart of a policy decision method according to another embodiment of the present invention.

FIG. 6 describes a process of a policy decision method according to another embodiment of the present invention, including:

For the related descriptions of steps 601 to 603, reference may be made to the related descriptions of steps 501 to 503 in the embodiment shown in FIG. 5, and details are not described herein again.

Step 604: The PCRF device determines whether a Sy session of the user B exists between the PCRF device and a charging system. If yes, step 605 is performed; otherwise, refer to the related description of establishment of a Sy session in the embodiment shown in FIG. 7.

Specifically, according to information about all Sy sessions that are managed by the PCRF device and performed between the PCRF device and the charging system, the PCRF device queries and determines whether a Sy session of the user B exists.

Step 605: If the session of the user B exists, the PCRF device determines whether the PCRF device has saved a current status of a required counter of the user B, that is, whether the PCRF device has acquired and saved the current status of the counter by using the Sy session. If the PCRF device has not saved the current status of the counter, the PCRF device acquires the current status of the counter of the user B from the charging system by using the Sy session.

Specifically, the having not saved the current status of the counter of the second user herein means that the current status of the counter has not been acquired by using the Sy session, or the current status of the counter is not saved in the PCRF device after the status of the counter is acquired by using the Sy session.

Step 606: The PCRF device requests for the current status of the required counter of the user B from the charging system.

Specifically, the PCRF device sends, to the charging system by using the Sy session of the user B, a request for acquiring the current status of the counter.

Specifically, after receiving the request, the charging system returns the current status of the counter, and subscribes to a status change notification mechanism of the counter. That is, when a status of the counter changes subsequently, the PCRF device is notified. A format of a request message used by the PCRF device to acquire and subscribe to the current status of the counter of the user B is as follows (including only some related parameters):

<SL-Request>::=<Diameter Header: 8388635, REQ, PXY>
<Session-Id>
. . .
*[Subscription-Id] an identifier of the user B, which is a group identifier if the user B is a group
*[Policy-Counter-Identifier] an identifier of the counter Step 607: The PCRF device receives the current status that is of the counter and returned by the charging system.

The charging system returns, in a response message of the request message in step 606, the requested current status of the counter, and a format of the CCA response message is as follows (including only some related parameters):
<SL-Answer>::=<Diameter Header: 8388635, PXY
<Session-Id>
{Auth-Application-Id}
. . .
*[Policy-Counter-Status-Report] the current status of the counter Step 608: After receiving the current status that is of the counter and returned by the charging system, the PCRF device may save the current status of the counter in the PCRF device. That is, the current status of the counter may be saved only within a life cycle of the Sy session of the user B. After the Sy session is ended, the PCRF device deletes a saved current value of the counter. The PCRF device performs policy decision according to the current status of the counter, and delivers a control policy obtained by means of policy decision to the gateway device. Certainly, for a specific policy decision method, reference may be made to the related description of step 502, and details are not described herein again.

For the related descriptions of steps 609 to 610, reference may be made to the related descriptions of steps 506 to 507 in the embodiment shown in FIG. 5, and details are not described herein again.

Figure 7:
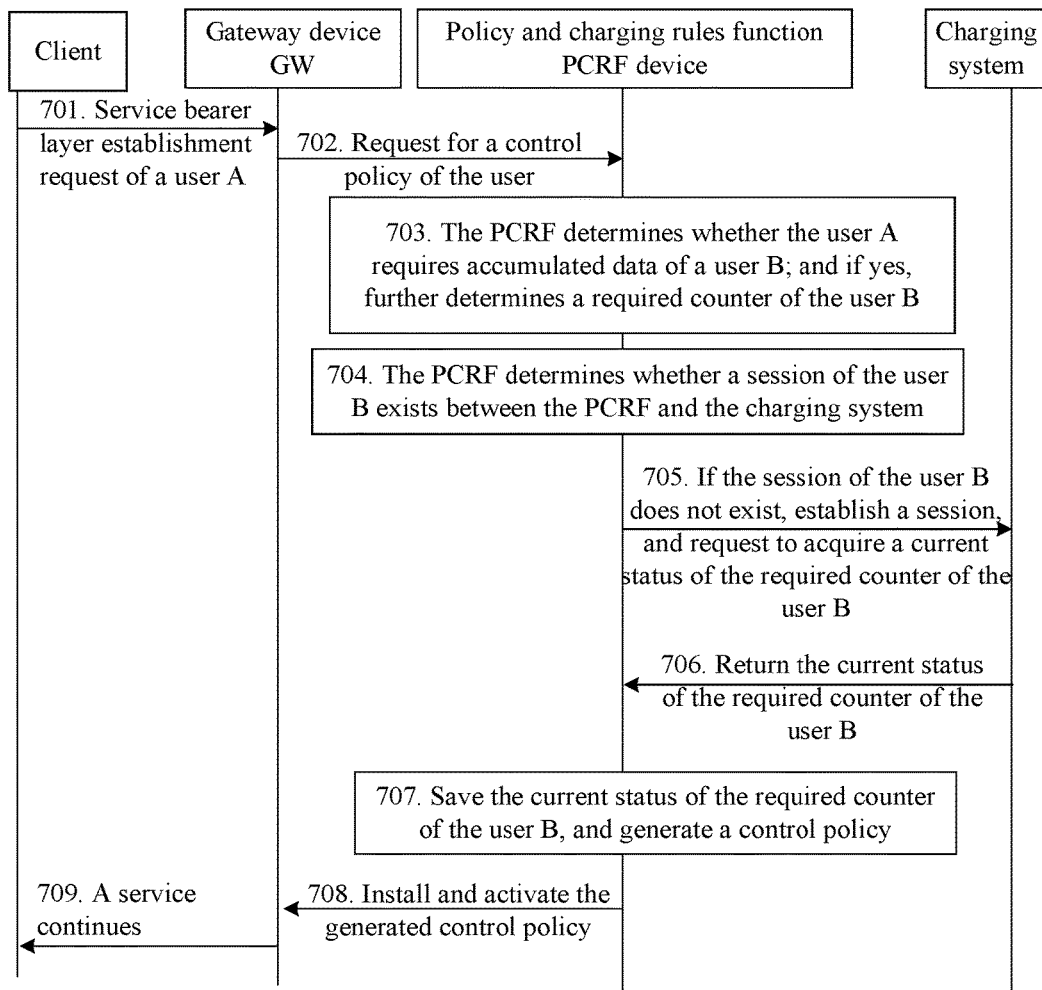
FIG. 7 is a flowchart of a policy decision method according to another embodiment of the present invention.

FIG. 7 describes a process of a policy decision method according to an embodiment of the present invention. The embodiment includes:

For the related descriptions of steps 701 to 703, reference may be made to the related descriptions of steps 501 to 503 in the embodiment shown in FIG. 5, and details are not described herein again.

Step 704: The PCRF device determines whether a Sy session of the user B exists between the PCRF device and a charging system. If no, step 705 is performed.

Specifically, according to information about all Sy sessions that are managed by the PCRF device and performed between the PCRF device and the charging system, the PCRF device queries and determines whether a Sy session of the user B exists.

Step 705: If the PCRF device determines that no Sy session of the user B exists between the PCRF device and the charging system, the PCRF device initiates a Sy session establishment request of the user B to the charging system, where the Sy session establishment request carries a required identifier of the user B. If the user B is a group, an identifier of the group is carried; otherwise, an identifier such as an IP address or MSISDN of the user is carried.

Specifically, the session establishment request may carry an identifier of the counter, and then the charging system directly returns a current status of the counter. Alternatively, an identifier of the counter may be not carried, and in this case, the charging system returns current statuses of all available counters, including the current status of the counter.

Specifically, the PCRF device sends, to the charging system, an acquiring request for acquiring the current status of the counter, which is also equivalent to subscribing to the counter. When a status of the counter changes subsequently, if an accumulated amount of the counter is greater than or less than a threshold, an OCS, namely, the charging system, notifies the PCRF device of a changed status of the counter.

Specifically, a format of the Sy session establishment request message is as follows (including only some related parameters):
<SL-Request>::=<Diameter Header: 8388635, REQ, PXY>
<Session-Id>
. . .
*[Subscription-Id] an identifier of the user B, which is a group identifier if the user B is a group
*[Policy-Counter-Identifier] an identifier of the counter Step 706: The PCRF device receives a response message that is of the Sy session establishment request and returned by the charging system, where a processing result of the Sy session establishment request is returned via the response message. If the session is established successfully, the response message further carries the requested current status of the counter of the user B.

A format of the response message is as follows (including only some related parameters):

<SL-Answer>::=<Diameter Header: 8388635, PXY
<Session-Id>
. . .
[Result-Code]
*[Policy-Counter-Status-Report]

Step 707: After receiving the current status that is of the counter of the user B and returned by the charging system, the PCRF device saves the current status of the counter in the PCRF device. The current status of the counter may be saved only when the Sy session of the user B exists. After the Sy session is ended, the PCRF device deletes a saved current value of the counter. The PCRF device performs policy decision according to the information and other related information, and delivers a decided policy to a PCEF. For a specific policy decision method, reference may be made to the related description of step 505, and details are not described herein again.

For the related descriptions of steps 708 to 709, reference may be made to the related descriptions of steps 506 to 507 in the embodiment shown in FIG. 5, and details are not described herein again.

Figure 8:
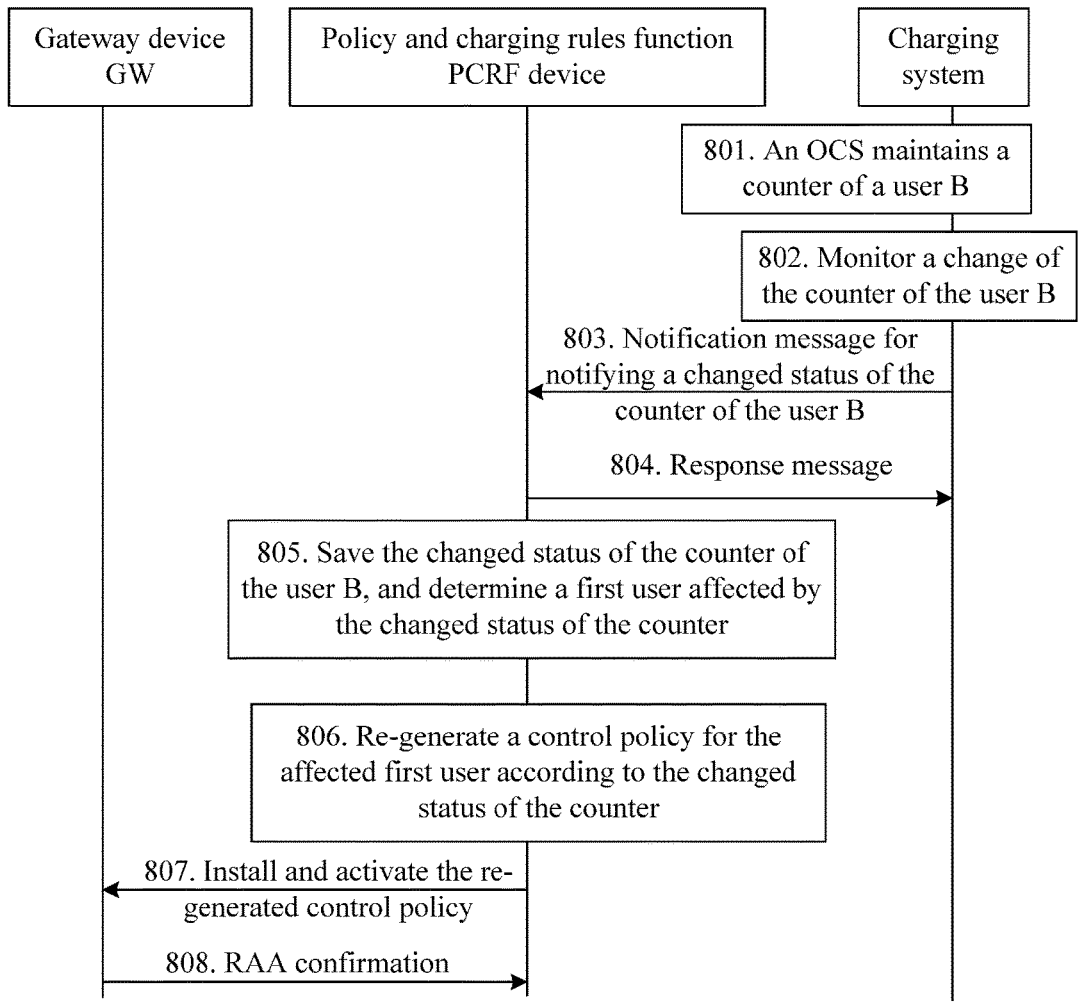
FIG. 8 is a flowchart of a policy decision method according to another embodiment of the present invention.

FIG. 8 describes a process of a policy decision method according to an embodiment of the present invention, including:

801: A charging system maintains a counter of a user B.

Specifically, the charging system may add, according to subscription, usage information of each user in a user group or usage information of a user who shares a quota with the user B to the counter of the user B cumulatively, no matter whether the user requires policy control to be performed based on the counter of the user B. That is, usage information of a user A may be added to the counter of the user B cumulatively, and usage information of another user who has an association relationship with the user B may also be added to the counter of the user B cumulatively.

If the user B is a group, an account needs to be set specially for the group in the charging system to facilitate storage and management of a counter of the group.

Certainly, in some cases, not all traffic volumes are added to the counter of the user B cumulatively. According to a subscription relationship, it is determined that some traffic volumes may not be added to a traffic volume of the user group cumulatively. For example, a user group that includes users A, B, and C share a 2G traffic volume, but services that are allowed sharing the 2G traffic volume exclude P2P, that is, services except P2P are allowed sharing the 2G traffic volume, and a traffic volume that needs to be accumulated herein is traffic volumes of other services except a P2P service.

802: The charging system monitors a change of the counter of the user B.

803: When the counter of the user B reaches a set value, the charging system sends a notification message to a PCRF device, so as to notify the PCRF device of a changed status of the counter of the user B.

Specifically, when a change of an accumulated amount of the counter of the user B reaches the set value, for example, reaches a preset threshold, the charging system may notify the PCRF device of the changed status of the counter of the user B by using a Sy session between the charging system and the PCRF device.

Specifically, counters and threshold ranges thereof are preconfigured in the charging system. For example, a threshold range of a counter, namely, counter 1, is shown in the following table:

|  | Threshold range | | |
| --- | --- | --- | --- |
|  | ≤100 MB | 100 MB-1 GB | ≥1 GB |
| Current status | — | ✓ | — |

When the charging system finds that an accumulated value of the counter 1 is greater than or equal to 1 GB, it is deemed that the counter reaches a preset threshold, and the charging system notifies the PCRF device of a new status of the counter by using a Sy session.

A format of the notification message is as follows (including only some related parameters):

<SN-Request>::=<Diameter Header: 8388636, REQ, PXY>
<Session-Id>
. . .
*[Policy-Counter-Status-Report] a changed current status of the counter 804: After receiving the notification message sent by the charging system, the PCRF device may return a response message to the charging system to respond to the notification message.

805: The PCRF device saves the changed status of the counter of the user B, and determines a first user affected by the changed status of the counter of the user B.

Specifically, the PCRF device may determine, according to information stored by the PCRF device or information stored in another entity, the first user affected by the changed status of the counter of the user B. The process is similar to determining a user who can share a usage quota with the user B. For a definition of the user who can share a usage quota, reference may be made to other embodiments of the present invention, and details are not described herein again.

Step 806: For the affected first user, the PCRF device performs policy decision for the first user again according to the changed status of the counter of the user B, that is, re-generates a control policy for the affected first user.

For a specific policy decision process, reference may be made to the related descriptions in other embodiments of the present invention, such as the related description of step 505, and details are not described herein again.

Step 807: The PCRF device delivers an instruction to a gateway device such as a PCEF, so that the gateway device installs and activates the newly generated control policy, and an old control policy becomes invalid.

Step 808: The gateway device PCEF executes the newly activated control policy and returns a confirmation message to the PCRF device.

After receiving the control policy delivered by the PCRF device again, the PCEF adjusts allocation of a network resource to a service data flow of the first user according to data such as QoS and bandwidth allocated in the control policy.

Figure 9:
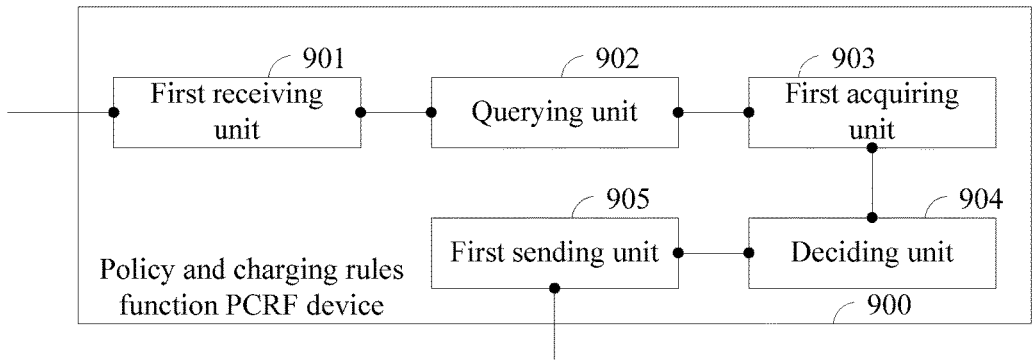
FIG. 9 is a structural diagram of a policy and charging rules function PCRF device according to an embodiment of the present invention.

The following describes a policy and charging rules function PCRF device provided in an embodiment of the present invention. FIG. 9 describes a policy and charging rules function PCRF device 900 according to an embodiment of the present invention, including a first receiving unit 901, a querying unit 902, a first acquiring unit 903, a deciding unit 904, and a first sending unit 905.

The first receiving unit 901 is configured to receive a policy request for a first user sent by a gateway device.

The querying unit 902 is configured to determine, according to the policy request, that the first user needs to use a counter of a second user, where the counter that is of the second user and needs to be used is a counter obtained by accumulating accumulated data of the second user.

The first acquiring unit 903 is configured to acquire a current status of the counter of the second user.

The deciding unit 904 is configured to generate a control policy of the first user according to the current status of the counter of the second user.

The first sending unit 905 is configured to send the control policy to the gateway device.

The querying unit 902 is specifically configured to acquire an identifier of the first user from the policy request; and determine, according to the identifier of the first user, that the first user and the second user are users who share a usage quota, and determine that the first user needs to use the counter of the second user.

From the foregoing technical solution provided by the embodiment of the present invention, it can be seen that, in the embodiment of the present invention, after receiving a policy request for a first user, a PCRF device determines that the first user can use accumulated data of a second user, thereby implementing sharing of the accumulated data between the first user and the second user. In this way, the PCRF device only needs to acquire a counter of the second user from a charging system, and the charging system also only needs to maintain the counter of the second user, which reduces accumulation performed by the charging system on a counter of the first user, and reduces internal processing pressure of the charging system and the PCRF device. In addition, because a quantity of users who require the charging system to perform accumulation is reduced, and because a quantity of users who need to exchange counters between the charging system and the PCRF device is reduced, a quantity of interactions between the PCRF device and the charging system is also reduced.

The querying unit 902 is specifically configured to query stored information according to the identifier of the first user and determine that the first user is a member of a group and determine that an owner of the group is the second user; and the querying unit determines that the first user and the second user are users who share a usage quota.

Alternatively, the querying unit 902 is specifically configured to query stored information according to the identifier of the first user and determine that a second user who has an association relationship with the first user exists; and the querying unit determines that the first user and the second user are users who share a usage quota.

Alternatively, the querying unit 902 is specifically configured to query stored information according to the identifier of the first user and determine that the first user is a member of a group identified by the second user, where the second user is an identifier of a group including multiple users; and the querying unit determines that the first user and the second user are users who share a usage quota.

The first acquiring unit 903 is specifically configured to establish a session that is of the second user and between the PCRF device and the charging system, and acquire the current status of the counter of the second user by using the established session of the second user. Before the first receiving unit 901 receives the policy request for the first user sent by the gateway device, the session of the second user has been established, and the first acquiring unit has acquired and saved the current status of the counter of the second user by using the established session of the second user; then the first acquiring unit 903 acquires the saved current status of the counter of the second user. Alternatively, before the first receiving unit 901 receives the policy request for the first user sent by the gateway device, the session of the second user has been established; then the first acquiring unit 903 acquires the current status of the counter of the second user from the charging system by using the session of the second user.

The first acquiring unit 903 is configured to send a counter status acquiring request to the charging system by using the session of the second user, where the counter status acquiring request includes an identifier of the counter; and the first receiving unit 901 is configured to receive a response message that is of the counter status acquiring request and sent by the charging system, where the response message includes the current status of the counter of the second user that is obtained by the charging system by means of query according to the identifier of the counter.

The first acquiring unit 903 is specifically configured to send a session establishment request of the second user to the charging system, where the session establishment request carries an identifier of the second user; and the first receiving unit 901 is specifically configured to receive a response message that is of the session establishment request and sent by the charging system, where the response message includes the current status of the counter of the second user that is obtained by the charging system by means of query according to the identifier of the second user.

The first acquiring unit 903 is specifically configured to save the acquired current status of the counter of the second user; and when the session of the second user is ended or when the session of the second user is not ended but the first acquiring unit determines that the current status of the counter of the second user is not required, the first acquiring unit deletes the saved current status of the counter of the second user.

After the first acquiring unit 903 acquires the current status of the counter, the first receiving unit 901 is specifically configured to receive a notification message sent by the charging system, where the notification message carries a changed status of the counter of the second user; the querying unit is specifically configured to determine that the changed status of the counter of the second user affects the first user, and re-generate a control policy for the affected first user according to the changed status of the counter; and the first sending unit is specifically configured to return a response message of the notification message to the charging system, and send the re-generated control policy to the gateway device by using a session that is of the first user and between the gateway device and the PCRF device.

The querying unit 902 is specifically configured to query the stored information, by the PCRF device and determine that the second user and the first user are users who share a usage quota and that the first user is currently online, so that the querying unit determines that the changed status of the counter of the second user affects the first user. For specific determining of a user who shares a usage quota, reference may be made to the related descriptions in other embodiments of the present invention, and details are not described herein again.

Figure 10:
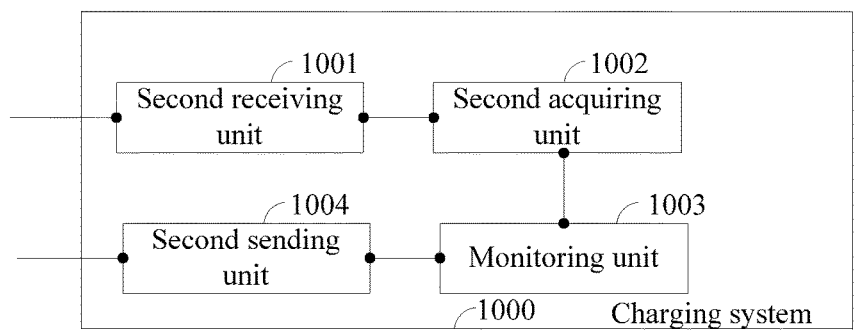
FIG. 10 is a structural diagram of a charging system according to an embodiment of the present invention.

FIG. 10 describes a structure of a charging system 1000 according to another embodiment of the present invention, including a monitoring unit 1003, a second receiving unit 1001, a second acquiring unit 1002, and a second sending unit 1004.

The monitoring unit 1003 is configured to maintain a counter corresponding to accumulated data of a second user, where the accumulated data is accumulations of multiple pieces of service usage information.

The second receiving unit 1001 is configured to: receive a session establishment request that is of the second user and sent by a policy and charging rules function PCRF device, and establish, according to the session establishment request of the second user, a session that is of the second user and between the charging system and the PCRF device; and receive, by using the session of the second user, a counter status acquiring request that is used to request the counter of the second user.

The second acquiring unit 1002 is configured to obtain, according to the counter status acquiring request, a current status of the counter of the second user from the counter that is of the second user and maintained by the monitoring unit.

The second sending unit 1004 is configured to return the current status of the counter of the second user to the PCRF device by using the session of the second user, so that the PCRF device determines an affected first user according to the current status of the counter of the second user, generates a control policy of the first user for the affected first user according to the current status of the counter of the second user, and sends the generated control policy to the gateway device by using a session that is of the first user and between the gateway device and the PCRF device.

From the foregoing technical solution provided by the embodiment of the present invention, it can be seen that, in the embodiment of the present invention, a charging system needs to maintain a counter that is obtained by means of accumulation of service usage information of a second user, acquire a current status of the counter of the second user from the maintained counter when receiving a counter status acquiring request of the second user, and send the current status of the counter of the second user to a PCRF device, so that the PCRF device determines a first user affected by the current status of the counter of the second user, and generates a control policy for the affected first user according to the current status of the counter of the second user, thereby implementing sharing of accumulated data between the first user and the second user. In this way, a charging system only needs to maintain the counter of the second user, accumulation performed by the charging system on a counter of the first user is reduced, and internal processing pressure of the charging system is also reduced. In addition, because a quantity of users who require the charging system to perform accumulation is reduced, and because a quantity of users who need to exchange counters between the charging system and the PCRF device is reduced, a quantity of interactions between the PCRF device and the charging system is also reduced.

The monitoring unit 1003 is specifically configured to monitor whether a status of the counter of the second user changes, and when the status of the counter of the second user changes, notify the second sending unit. The second sending unit is specifically configured to send a notification message to the PCRF device by using the session of the second user according to the counter status acquiring request, where the notification message carries a changed status of the counter of the second user, so that the PCRF device determines the affected first user according to the changed status of the counter, re-generates a control policy of the first user for the affected first user according to the changed status of the counter, and sends the re-generated control policy to the gateway device.

The monitoring unit 1003 may also be configured to: monitor that a change of a value of the counter of the second user causes a current value of the counter to be greater than or less than a set value, and when the change of the value of the counter of the second user causes the current value of the counter to be greater than or less than the set value, notify the second sending unit of the changed status of the counter by using the session of the second user. The second sending unit is specifically configured to send the notification message to the PCRF device by using the session of the second user.

The second acquiring unit 1002 is specifically configured to receive the counter status acquiring request sent by the PCRF device, where the counter status acquiring request includes an identifier of the second user and an identifier of the counter. The second sending unit is specifically configured to send a response message of the counter status acquiring request to the PCRF device, where the response message includes the current status of the counter of the second user that is obtained by the charging system by means of query according to the identifier of the second user.

Certainly, units in a charging device shown in FIG. 10 may also implement the following functions in addition to the functions in the foregoing embodiment, and details are described in the following:

The second receiving unit 1001 is configured to: receive accumulated data of a third user who shares a usage quota with the second user, and add the accumulated data of the third user that is received to the counter of the second user cumulatively; after receiving a session establishment request of the second user sent by the PCRF device, establish, according to the session establishment request of the second user, a session that is of the second user and between the charging system and the PCRF device; and receive a counter status acquiring request that is used to request the counter of the second user and sent by the PCRF device during or after establishment of the session.

The second acquiring unit 1002 is configured to obtain, according to the counter status acquiring request, a current status of the counter of the second user from the maintained counter that is obtained by means of accumulation of service usage information of multiple users.

The second sending unit 1004 is configured to send the current status of the counter of the second user to the PCRF device, so that the PCRF device determines an affected first user according to the current status of the counter of the second user, generates a control policy of the first user for the affected first user, and sends the generated control policy to the gateway device by using a session that is of the first user and between the gateway device and the PCRF device.

From the foregoing technical solution provided by the embodiment of the present invention, it can be seen that, service usage information of a second user is maintained in a charging system, a third user and the second user are users who can share a usage quota; therefore, the charging system adds service usage information of the third user to a counter of the second user cumulatively, and when receiving a counter status acquiring request of the second user, the charging system acquires a current status of the counter of the second user from a maintained counter, and sends the current status of the counter of the second user to a PCRF device, so that the PCRF device determines a first user affected by the current status of the counter of the second user, and the PCRF device generates a control policy for the affected first user according to the current status of the counter of the second user. Therefore, it is implemented that the first user can use accumulated data of the second user and the third user, and that the first user can share accumulated data of the second user. In this way, the charging system needs to maintain only counters of the second user and the third user, accumulation performed by the charging system on a counter of the first user is reduced, and internal processing pressure of the charging system is also reduced. In addition, because a quantity of users who require the charging system to perform accumulation is reduced, and because a quantity of users who need to exchange counters between the charging system and the PCRF device is reduced, a quantity of interactions between the PCRF device and the charging system is also reduced.

The second receiving unit 1001 is specifically configured to: after receiving the service usage information of the third user, query stored information and determine that the third user is a member of a group and that an owner of the group is the second user, and determine that the second user and the third user are users who share a usage quota, where the stored information may be subscription information of a user, where the subscription information indicates which users share a usage quota, for example, Table 1, Table 2, and Table 3 in the embodiments of the present invention.

Alternatively, the second receiving unit 1001 is specifically configured to: after receiving the service usage information of the third user, query stored information and determine that the second user and the third user are users who have an association relationship, and determine that the second user and the third user are users who share a usage quota.

Alternatively, the second receiving unit 1001 is specifically configured to: after receiving the service usage information of the third user, query stored information and determine that the third user is a member of a group and that the second user is a group including multiple users, where the third user is a member of the group that is the second user, and determine that the third user and the second user are users who share a usage quota.

The monitoring unit 1003 may also be configured to: monitor whether a status of the counter changes, and when the status of the counter changes, notify the second sending unit 1004. The second sending unit 1004 may also be configured to: send a notification message to the PCRF device according to the counter status acquiring request, where the notification message carries a changed status of the counter of the second user, so that the PCRF device determines the affected first user according to the changed status of the counter, re-generates a control policy of the first user for the affected first user, and sends the re-generated control policy to the gateway device.

Figure 11:
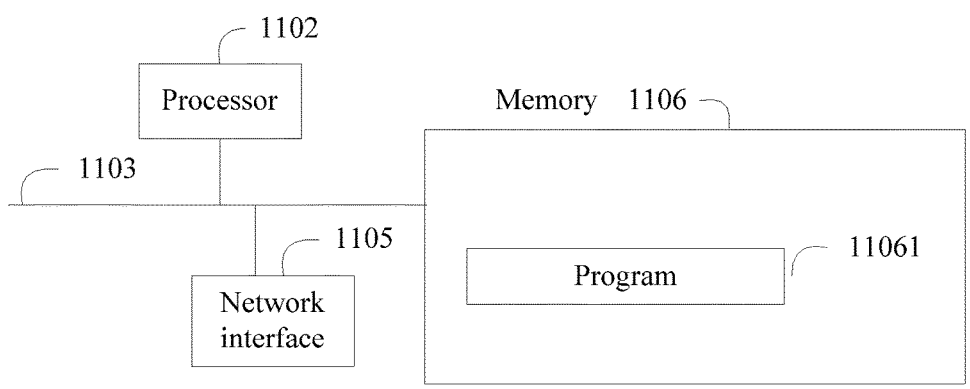
FIG. 11 is a structural diagram of a policy and charging rules function PCRF entity according to another embodiment of the present invention.

FIG. 11 illustrates a structure of a policy and charging rules function PCRF device according to another embodiment of the present invention, including at least one processor 1102 (for example, a CPU), at least one network interface 1105 or another communications interface, a memory 1106, and at least one communications bus 1103 configured to implement connection and communication between the apparatuses. The processor 1102 is configured to execute an executable module, such as a computer program, stored in the memory 1106. The memory 1106 may include a high-speed random access memory (RAM), or may further include a non-volatile memory, such as at least one magnetic disk memory. Communication connection between a system gateway and at least one other network element is implemented by using the at least one network interface 1105 (which may be wired or wireless), for example, the Internet, a wide area network, a local area network, or a metropolitan area network may be used.

In some implementation manners, the memory 1106 stores a program 11061, and the program 11061 may be executed by the processor 1102. The program includes: receiving, by a policy and charging rules function PCRF device, a policy request for a first user sent by a gateway device; determining, by the PCRF device according to the policy request, that the first user needs to use a counter of a second user; acquiring, by the PCRF device, a current status of the counter of the second user by using a session that is of the second user and established between the PCRF device and a charging system; and generating, by the PCRF device, a control policy of the first user according to the current status of the counter of the second user, and sending the control policy to the gateway device.

From the foregoing technical solution provided in the embodiment of the present invention, it can be seen that, in the embodiment of the present invention, after receiving a policy request for a first user, a PCRF device determines that the first user can use accumulated data of a second user, thereby implementing sharing of the accumulated data between the first user and the second user. In this way, a charging system needs to maintain only one copy of the accumulated data of the second user, and one PCRF device needs to establish only one session with an OCS and acquire a status of the accumulated data of the second user by using the session for one time, to implement policy control, based on the accumulated data, on all first users who can share a usage quota with the second user, which reduces pressure of processing such as maintenance and notification performed by the charging system on the shared accumulated data, reduces a quantity of sessions established between the charging system and the PCRF device and a quantity of interactions between the charging system and the PCRF device, and further decreases a performance loss of the charging system.

Figure 12:
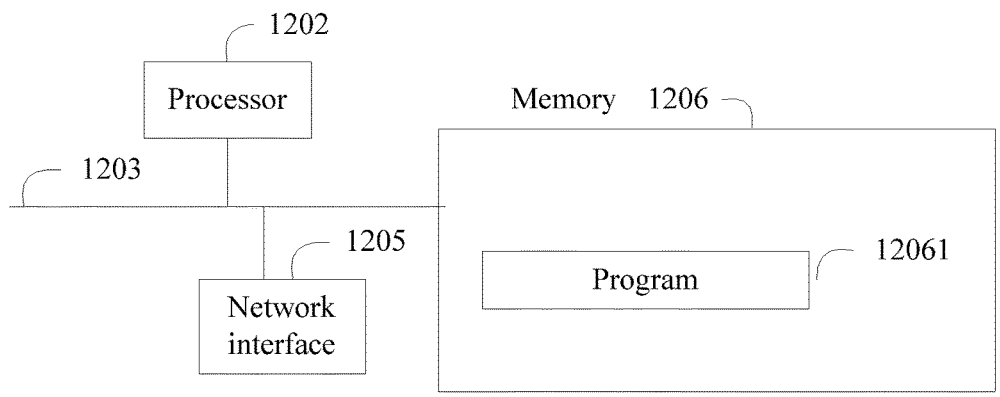
FIG. 12 is a structural diagram of a charging system according to another embodiment of the present invention.

FIG. 12 illustrates a structure of a charging device according to another embodiment of the present invention, including at least one processor 1202 (for example, a CPU), at least one network interface 1205 or another communications interface, a memory 1206, and at least one communications bus 1203 configured to implement connection and communication between the apparatuses. The processor 1202 is configured to execute an executable module, such as a computer program, stored in the memory 1206. The memory 1206 may include a high-speed random access memory (RAM), or may further include a non-volatile memory such as at least one magnetic disk memory. Communication connection between a system gateway and at least one other network element is implemented by using the at least one network interface 1205 (which may be wired or wireless), for example, the Internet, a wide area network, a local area network, or a metropolitan area network may be used.

In some implementation manners, the memory 1206 stores a program 12061, and the program 12061 may be executed by the processor 1202. The program includes: maintaining, by a charging system, a counter of a second user; receiving, by the charging system, a session establishment request that is of the second user and sent by a policy and charging rules function PCRF device; establishing, by the charging system according to the session establishment request of the second user, a session that is of the second user and between the charging system and the PCRF device; receiving, by the charging system by using the session of the second user, a counter status acquiring request that is used to request the counter of the second user; obtaining, by the charging system, a current status of the counter of the second user from the maintained counter of the second user according to the counter status acquiring request; and returning, by the charging system, the current status of the counter of the second user to the PCRF device by using the session of the second user, so that the PCRF device determines an affected first user according to the current status of the counter of the second user, generates a control policy of the first user for the affected first user according to the current status of the counter of the second user, and sends the generated control policy to the gateway device by using a session that is of the first user and between the gateway device and the PCRF device.

From the foregoing technical solution provided in the embodiment of the present invention, it can be seen that, in the embodiment of the present invention, a charging system maintains accumulated data of service usage information of a second user and a status of a counter corresponding to the accumulated data, and after receiving a counter status acquiring request of the second user, acquires a current status of the counter of the second user from the maintained counter, and sends the current status of the counter of the second user to a PCRF device, so that the PCRF device determines a first user affected by the current status of the counter of the second user, and generates a control policy for the affected first user according to the current status of the counter of the second user, thereby implementing sharing of the accumulated data between the first user and the second user. In this way, the charging system needs to maintain only one copy of the accumulated data of the second user, and one PCRF device needs to establish only one session with an OCS and acquire a status of the accumulated data of the second user by using the session for one time, to implement policy control, based on the accumulated data, on all first users who have an association relationship with the second user, which reduces pressure of processing such as maintenance and notification performed by the charging system on the shared accumulated data, reduces a quantity of sessions established between the charging system and the PCRF device and a quantity of interactions between the charging system and the PCRF device, and further decreases a performance loss of the charging system.

An embodiment of the present invention further provides a policy decision system. The policy decision system provided in the embodiment of the present invention may include the policy and charging rules function PCRF device and the charging system according to any embodiment of the present invention.

Figure 13:
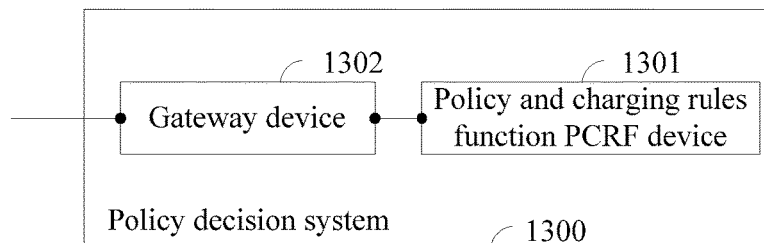
FIG. 13 is a structural diagram of a policy decision system according to an embodiment of the present invention.

FIG. 13 illustrates a structure of a charging system according to an embodiment of the present invention. The charging system includes a policy and charging rules function PCRF device 1301 and a gateway device 1302.

The gateway device 1302 is configured to receive a service bearer layer establishment request sent by a client of a user, and send a policy request to the PCRF device 1301 according to the request, so as to request a control policy of the user.

The policy and charging rules function PCRF device 1301 is configured to: receive the policy request sent by the gateway device 1302, and determine, according to the policy request, that a first user needs to use a counter of a second user; acquire a current status of the counter of the second user; and generate a control policy of the first user according to the current status of the counter of the second user, and send the control policy to the gateway device 1302. For the structure of the PCRF device 1301 and specific processing performed by the PCRF device 1301, reference may be made to the related description in the foregoing embodiments of the present invention, and details are not described herein again.

Figure 14:
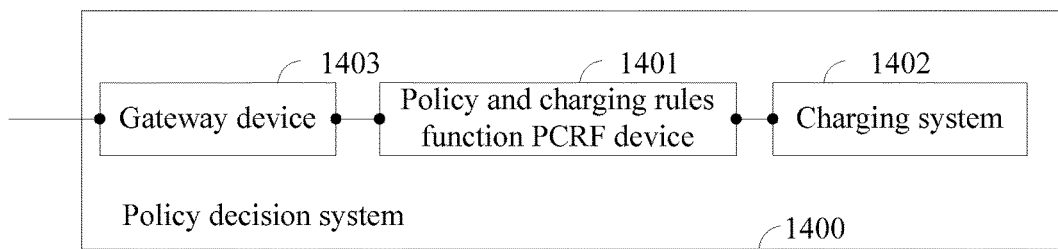
FIG. 14 is a structural diagram of a policy decision system according to another embodiment of the present invention.

FIG. 14 illustrates a structure of a charging system according to an embodiment of the present invention. The charging system includes a policy and charging rules function PCRF device 1401, a charging device 1402, and a gateway device 1403. Specific implementation processes of the policy and charging rules function PCRF device 1401 and the gateway device 1403 are the same as those of the PCRF device 1301 and the gateway device 1302 shown in FIG. 13.

The charging device 1402 is configured to: maintain a counter of a second user for the charging system; receive a session establishment request that is of the second user and sent by the policy and charging rules function PCRF device 1401; establish, according to the session establishment request of the second user, a session that is of the second user and between the charging system 1402 and the PCRF device 1401; receive a counter status acquiring request during or after establishment of the session, where the request is used to request the counter of the second user; obtain a current status of the counter of the second user from the maintained counter of the second user according to the counter status acquiring request; and return the current status of the counter of the second user to the PCRF device 1401 by using the session of the second user, so that the PCRF device 1401 determines an affected first user according to the current status of the counter of the second user, generates a control policy of the first user for the affected first user according to the current status of the counter of the second user, and sends the generated control policy to the gateway device 1403 by using a session that is of the first user and between the gateway device 1403 and the PCRF device 1401.

Alternatively, on a basis that the foregoing functions are implemented, the charging system 1403 is further configured to: after receiving service usage information of a third user who shares a usage quota with the second user, add the received service usage information of the third user to the counter of the second user cumulatively; after receiving a session establishment request of the second user sent by the policy and charging rules function PCRF device, establish, according to the session establishment request of the second user, a session that is of the second user and between the charging system and the PCRF device; receive a counter status acquiring request during or after establishment of the session, where the request is used to request the counter of the second user; obtain, according to the counter status acquiring request, a current status of the counter of the second user from the maintained counter obtained by means of accumulation of service usage information of multiple users; and send the current status of the counter of the second user to the PCRF device, so that the PCRF device 1401 determines an affected first user according to the current status of the counter of the second user, generates a control policy of the first user for the affected first user, and sends the generated control policy to the gateway device 1403 by using a session that is of the first user and between the gateway device 1403 and the PCRF device 1401.

For the structure of the PCRF device 1401 and the charging device 1402 and specific processing performed by the PCRF device 1401 and the charging device 1402, reference may be made to the related descriptions in the foregoing embodiments of the present invention, and details are not described herein again.

Content such as information exchange and an execution process between the units and modules in the foregoing apparatus and system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

Specific embodiments are used in this specification to describe the principle and implementation manners of the present invention. The foregoing embodiments are merely intended to help understand the method and idea of the present invention. In addition, with respect to the implementation manners and the application scope, modifications may be made by a person of ordinary skill in the art according to the idea of the present invention. Therefore, the specification shall not be construed as a limitation on the present invention.

What is claimed is:

1. A policy decision system, comprising a policy and charging rules function (PCRF) device, and a charging system, wherein:
   the PCRF device is configured to receive a policy request of a first user sent by a gateway device, and determine, according to the policy request, that the first user needs to use a counter of a second user, and acquire a current status of the counter of the second user, and generate a control policy of the first user according to the current status of the counter of the second user, and send the control policy to the gateway device; and
   the charging system is configured to send the current status of the counter of the second user to the PCRF device.

2. The policy decision system according to claim 1, wherein:
   The PCRF device acquires the current second user counter status comprises:
   before the PCRF device receives the first user policy request sent by the gateway device, a second user session has been established between the PCRF device and the charging system, and the PCRF device has acquired and saved the current second user counter status using the second user session.

3. The policy decision system according to claim 1, wherein:
   before the PCRF device receives the first user policy request sent by the gateway device, a second user session has been established between the PCRF device and a charging system; and
   the PCRF device acquires the current second user counter status comprises:
   the PCRF device acquires the current second user counter status from the charging system using the second user session.

4. The policy decision system according to claim 3, wherein:
   the PCRF device acquires the current second user counter status from the charging system using the second user session comprises:
   the PCRF device sends a counter status acquiring request to the charging system using the second user session, wherein the counter status acquiring request includes a second user counter identifier of the second user counter; and
   the PCRF device receives a response message sent by the charging system, wherein the response message comprises the current second user counter status.

5. The policy decision system according to claim 1, wherein:
   the PCRF device acquires the current second user counter status comprises:
   the PCRF device sends a session establishment request of the second user to the charging system, wherein the session establishment request carries a second user identifier of the second user; and
   the PCRF device receives a response message to the session establishment request sent by the charging system, wherein the response message comprises a result of session establishment by the charging system according to the second user identifier and comprises the acquired current second user counter status.

6. The policy decision system according to claim 1, wherein:
   after the PCRF device acquires the current second user counter status, the PCRF device further configured to:
   receives a notification message sent by the charging system, wherein the notification message carries a changed status of the second user counter,
   determines that the changed status of the second user counter affects the first user; and
   re-generates the first user control policy for the affected first user according to the changed status of the second user counter, and sending the re-generated first user control policy to the gateway device using a first user session between the gateway device and the PCRF device.

7. The policy decision system according to claim 6, wherein:
   the PCRF device determines that the changed status of the second user counter affects the first user comprises:
   the PCRF device queries he stored information and determining that the second user and the first user share the usage quota, that the first user is currently online, and that the changed status of the second user counter affects the first user.

8. The policy decision system according to claim 1, wherein:
   the PCRF device is further configured to save the acquired current second user counter status; and
   when the second user session is ended or when the second user session is not ended but the PCRF device determines that the current second user counter status is not required, the PCRF device further configured to delete the saved current second user counter status.

9. The policy decision system according to claim 1, wherein:
   the PCRF device determines that the first user and the second user share the usage quota, and the second user is the owner user of the usage quota comprises:
   the PCRF device queries stored information according to a first user identifier of the first user in the first user policy request and determining that the first user is a member of a group and an owner of the group is the second user.

10. The policy decision system according to claim 1, wherein:

the PCRF device determines that the first user and the second user share the usage quota, and the second user is the owner user of the usage quota comprises:

the PCRF device queries stored information according to a first user identifier of the first user in the first user policy request and determining that the first user is a member of a group identified by the second user, wherein the second user is an identifier of a group comprising multiple users.

11. The policy decision system according to claim 1, wherein:

the charging system further configured to maintain a counter of a second user, and receive a session establishment request that is of the second user and sent by a policy and charging rules function PCRF device, and establish, according to the session establishment request of the second user, a session that is of the second user and between the charging system and the PCRF device.

12. The policy decision system according to claim 11, wherein, the charging system maintains a counter of a second user comprises: the charging system monitors whether a status of the counter of the second user changes; and the charging system sends the current status of the counter of the second user to the PCRF device comprises: when the status of the counter of the second user changes, and the charging system sends a notification message to the PCRF device, wherein the notification message carries a changed status of the counter of the second user.

13. The policy decision system according to claim 11, wherein, the charging system maintains a counter of a second user comprises: the charging system monitors that a change of a value of the counter of the second user causes a current value of the counter to be greater than or less than a set value; and the charging system sends the current status of the counter of the second user to the PCRF device comprises: when the change of the value of the counter of the second user causes the current value of the counter to be greater than or less than the set value, the charging system determines that the status of the counter changes, and send the changed status of the counter to the PCRF device.

14. The policy decision system according to claim 11, wherein, the charging system is further configured to receive accumulated data of a third user who shares a usage quota with the second user, and add the accumulated data of the third user that is received to the counter of the second user cumulatively.

15. The policy decision system according to claim 14, wherein, the charging system is further configured to query, after receiving the accumulated data of the third user, information stored in the charging system and determine that the third user is a member of a group and that an owner of the group is the second user, and determine that the second user and the third user are users who share a usage quota.

16. The policy decision system according to claim 14, wherein:

the charging system is further configured to query, after receiving the accumulated data of the third user, information stored in the charging system, and determine that the second user and the third user are users who have an association relationship, and determine that the second user and the third user are users who share a usage quota.

17. The policy decision system according to claim 14, wherein, the charging system is further configured to query, after receiving the accumulated data of the third user, information stored in the charging system and determine that the third user is a member of a group and that the second user is a group comprising multiple users, wherein the third user is a member of the group that is the second user, and determine that the third user and the second user are users who share a usage quota.

18. A policy decision method, comprising:

receiving, by a policy and charging rules function (PCRF) device, a first user policy request for a first user sent by a gateway device;

querying, by the PCRF device, stored information according to a first user identifier of the first user in the first user policy request;

determining, by the PCRF device, that the first user is a member of a group identified by the second user, wherein the second user is an identifier of a group comprising multiple users;

acquiring, by the PCRF device, a current second user counter status of a second user counter of the second user; and generating, by the PCRF device, a first user control policy according to the current second user counter status and sending the first user control policy to the gateway device.

* * * * *